United States Patent
Ataman

(10) Patent No.: US 8,902,084 B2
(45) Date of Patent: Dec. 2, 2014

(54) SWITCH ASSEMBLY AND OVER-STEER DETECTION SYSTEM

(71) Applicant: Messier-Dowty Inc., Ajax (CA)

(72) Inventor: Gary Ataman, Whitby (CA)

(73) Assignee: Messier-Dowty Inc., Ajax (CA)

( * ) Notice: Subject to any disclaimer, the term of this patent is extended or adjusted under 35 U.S.C. 154(b) by 8 days.

(21) Appl. No.: 13/754,993

(22) Filed: Jan. 31, 2013

(65) Prior Publication Data

US 2014/0210647 A1  Jul. 31, 2014

(51) Int. Cl.
*G08B 21/00* (2006.01)
*G08B 21/18* (2006.01)
*H01H 3/16* (2006.01)

(52) U.S. Cl.
CPC ........... *H01H 3/16* (2013.01); *G08B 21/187* (2013.01)
USPC .......................................... 340/960; 340/465

(58) Field of Classification Search
USPC .................... 340/960, 465; 414/426
See application file for complete search history.

(56) References Cited

U.S. PATENT DOCUMENTS

| | | | | |
|---|---|---|---|---|
| 2,233,187 A | * | 2/1941 | Von Hoorn | 337/60 |
| 5,527,053 A | * | 6/1996 | Howard | 280/90 |
| 6,003,887 A | * | 12/1999 | Howard | 280/89.11 |
| 6,829,524 B2 | * | 12/2004 | Chee | 701/1 |
| 2003/0132054 A1 | * | 7/2003 | Gillman et al. | 180/446 |
| 2005/0196256 A1 | * | 9/2005 | Rodenkirch et al. | 414/426 |
| 2005/0288142 A1 | * | 12/2005 | Yamanaka et al. | 475/4 |

* cited by examiner

*Primary Examiner* — John A Tweel, Jr.
(74) *Attorney, Agent, or Firm* — Omar A Nassif

(57) ABSTRACT

A switch assembly is disclosed having a switch with an actuator moveable from an armed position to a disarmed position. A housing is attached to the switch and contains a cam that holds the switch actuator in the armed position. A trigger makes contact with the cam causing it to rotate within the housing and allowing the actuator to extend to move to a disarmed position. In some variants the cam can be shaped to prevent manual rotation against the bias force of the actuator in the disarmed position. The switch assembly can be positioned on an aircraft landing gear to detect an over-steer occurrence where the landing gear may become damaged. The state of the switch can be visibly or audibly indicated by an indicator in the aircraft cockpit or other location visible/audible to the ground operators.

19 Claims, 6 Drawing Sheets

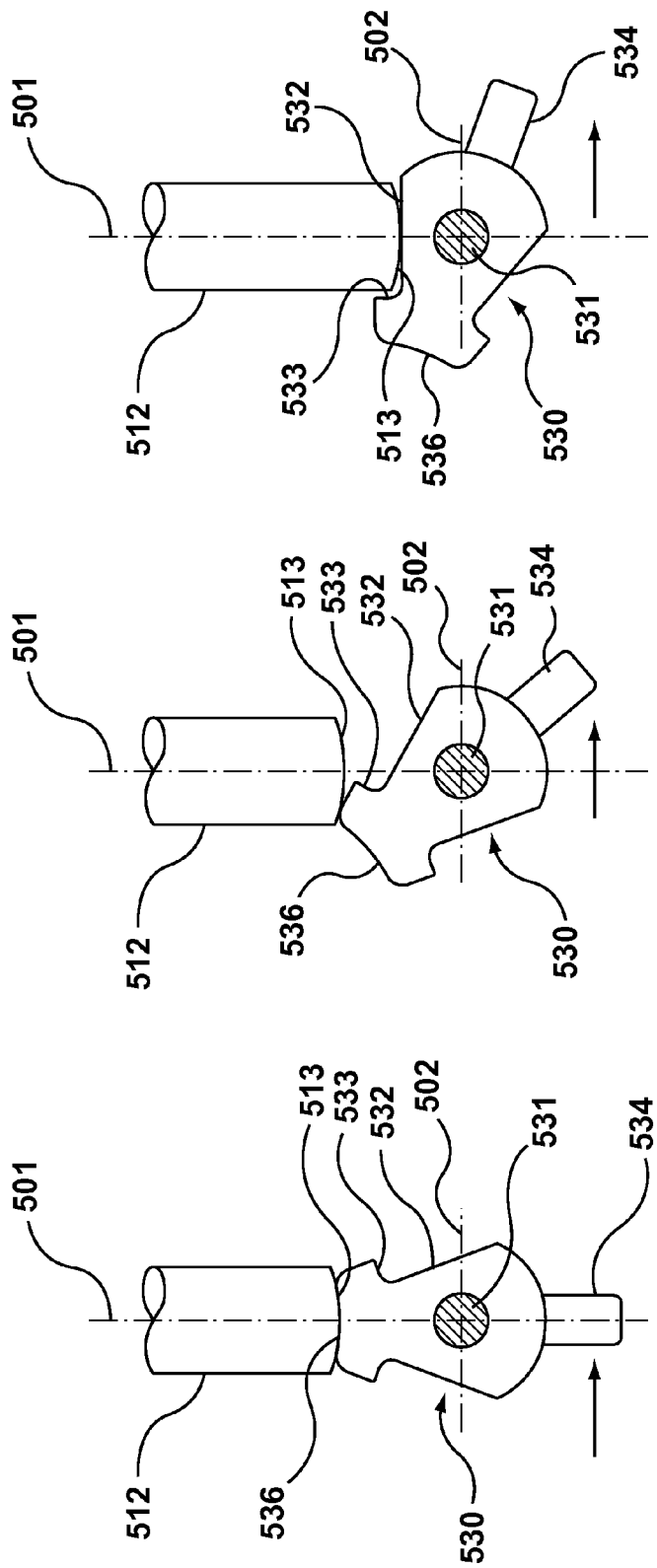

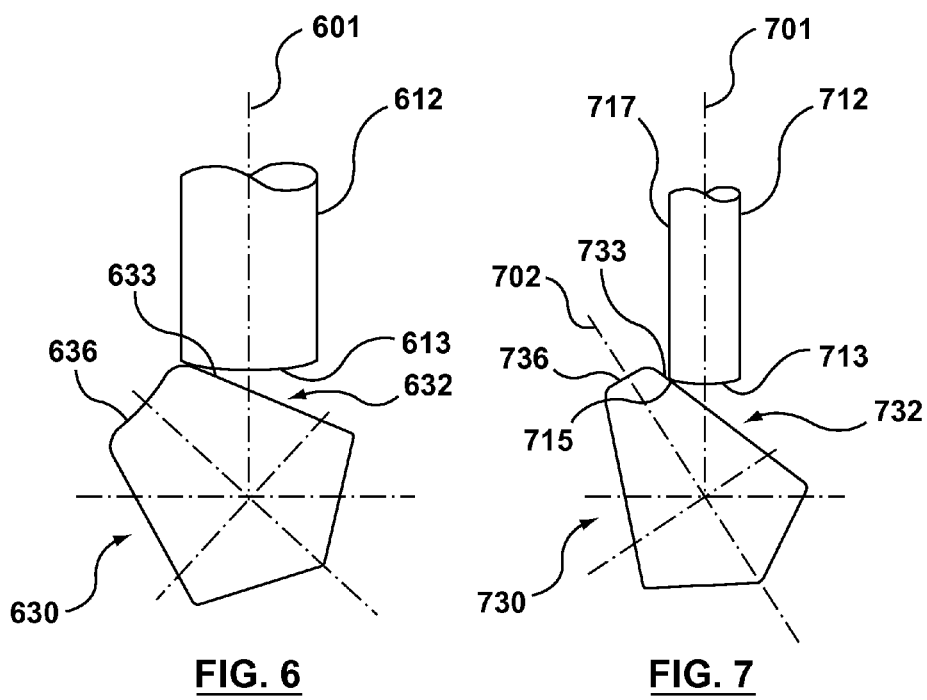

SWITCH ASSEMBLY AND OVER-STEER DETECTION SYSTEM

FIELD

The invention relates to a switch assembly and in particular to a switch assembly that detects the occurrence of over-steer of an aircraft landing gear.

BACKGROUND

Switches and switch assemblies are known and are generally used to indicate the difference in, or move between, two states. Switches may be used to indicate positional changes, such as the change in a position of an object being monitored.

There are several situations in which switches may be used in aircraft, and in particular in aircraft landing gear. The landing gear in aircraft, and in particular any changes in state of the landing gear, are monitored very careful to ensure the safety of the aircraft when in operation. Indicating means may be used to show a change in position of two components of the aircraft landing gear relative to each other. Indicating means may also be used to show a change in state of a specific component relative to its normal operational state.

Aircraft are often towed or pushed to position the aircraft when at or near the gate, and also to move aircraft around the airport. An important consideration when towing or pushing an aircraft involves preventing the aircraft steering angle from moving beyond its mechanical limits. This is referred to as over-steer. Damage may occur when a tow vehicle attempts to steer an aircraft nose landing gear beyond its mechanical limits of travel and possibly impart a high load over the strength and of the landing gear and air frame. This loading can result in deformation, fatigue, and ultimately, failure of the parts under stress. It is useful to have an indication of whether an over-steer event has occurred as the landing gear may have become damaged.

Tow vehicles can include warning systems to alert ground operators of potential over-steer, and ground support tow bars can have built-in fuses. In addition, the nose landing gear can have a fuseable tow fitting or disconnecting torque links to prevent towing torque transferring to the landing gear and airframe. These systems have problems because they rely on proper operation by the ground operations personnel and communicating faults or warnings to the aircraft operator (e.g. the pilot).

In order to ascertain when an over-steer event has occurred, a monitoring system or switch may be used that can indicate when such an event has occurred. Proximity sensors coupled to an electronic control box have been used in the past to indicate the occurrence of an over-steer event. Proximity sensors are generally more expensive than mechanical switches and also require a continuous power source, such as a battery, to operate the sensors when the aircraft is not powered. These proximity sensor can also be expensive to install, causes increased weight, due to sensors, targets and associated electronics, and creates additional points of failure that affect costs associated with maintenance and reliability. Proximity sensor systems typically require 2 or more proximity sensors, thus adding to the weight and complexity of the system.

Some large commercial aircraft use a proximity sensor based over-steer detection system. The system uses multiple proximity sensors that are mounted at the limits and detect targets that travel near the proximity sensor to indicate over-steer. Disadvantages of these systems include the inability to detect over-steer events if the system is not powered on and the requirement of a black box for conditioning and processing the proximity sensors signals that adds additional costs and must be integrated with the aircraft.

Another problem with switches that monitor for over-steer events is that tow operators may be able to reset the switch manually. If a tow operator has caused an over-steer event, the tow operator may be inclined to reset the switch so that the over-steer will not be detected to avoid being reprimanded or punished. Also, existing mechanical switches may not be practical in a high vibration landing gear environment.

SUMMARY

Accordingly, in one aspect a switch assembly is disclosed having an actuator that is biased against a mechanical cam that triggers the switch assembly from the armed state to the disarmed state. Using a mechanical cam and switch actuator to determine if the triggering event has occurred does not require the switch assembly to be powered to record the occurrence of the triggering event, and can be indicated to the cockpit or operations personnel once the switch is powered.

In another aspect, a switch assembly is disclosed having an actuator that is biased against a mechanical cam in the disarmed state to prevent manually resetting the switch to an armed position after the occurrence of the triggering event by moving the cam back towards the armed state.

In yet another aspect, an over-steer detection system for detecting over-steer event of an aircraft landing gear is described using a switch assembly as described herein for monitoring the occurrence of an over-steer event and providing an indication to the cockpit and operations personnel.

In one embodiment, an over-steer detection system for detecting an over-steer event of an aircraft landing gear is provided. The system comprises a switch having an actuator movable between an armed and disarmed position, the actuator biased towards the disarmed position; a housing coupled to the switch; a cam rotatable within the housing, the cam having an actuator-engaging portion and a trigger-engaging portion, the cam having an active position and a triggered position, in the active position the actuator-engaging portion of the cam maintains the actuator in the armed position; a trigger that engages the trigger-engaging portion of the cam to move the cam towards the triggered position in the over-steer event, in the triggered position the actuator moves to the disarmed position; and an indicator coupled to the switch to signify occurrence of the over-steer event.

It is contemplated that the housing can be mounted to the aircraft landing gear and the trigger is a protrusion on the aircraft landing gear that engages the cam during the over-steer event. It is further contemplated that the actuator biased in the disarmed position maintains the cam in the triggered position after an over-steer event. The actuator-engaging portion of the cam can be shaped to engage the actuator in the triggered position to prevent manual rotation of the cam. For example, it is contemplated that a side surface of the actuator-engaging portion defines a depression to prevent manual rotation of the cam. It is further considered that the actuator can be a plunger with a rounded end and the actuator-engaging portion of the cam has concave end portion to prevent accidental switch actuation. In some embodiments, the trigger-engaging portion of the cam can protrude from the housing in the active position, and that in the triggered position, the trigger-engaging portion of the cam is recessed within the housing. It is further considered that the an axis of rotation of the cam within the housing can be positioned to result in a large movement of the actuator-engaging portion from a small movement of the trigger-engaging portion.

In another embodiment, a switch device is disclosed comprising a switch having an actuator moveable between a retracted and extended position, the actuator biased to the extended position; a cam housing coupled to switch; and a cam rotatable within the cam housing, the cam engaging the actuator and rotatable from an active position to a latched position, in the active position the cam maintains the actuator in the retracted position. It is contemplated that the cam can have an actuator-engaging surface that is shaped to engage the actuator in the active position to prevent unintended switch actuation. For example, the actuator can be a cylindrical plunger with a rounded end and the actuator-engaging surface can be concave shaped. It is considered that in the latched position the actuator is in the extended position and engages the cam to limit movement of the cam towards the active position. The latching surface can be shaped to limit movement of the cam when engaged with the actuator in the latched position. In alternative embodiments, the latching surface can define a depression to limit movement of the cam when engaged with the actuator in the latched position. In other alternative embodiments, the latching surface can be angled to prevent movement of the cam when engaged with the actuator in the latched position.

BRIEF DESCRIPTION OF THE DRAWINGS

The present invention will now be described in further detail with reference to the following figures:

FIGS. 5A-C illustrates an embodiment of a cam of the switch assembly, described herein, interacting with the actuator of the switch;

FIG. 6 illustrates an embodiment of a cam and actuator geometry that may not be suitable to prevent rotation of the cam back to the armed position; and FIG. 7 illustrates an embodiment of a cam and actuator geometry that is preferable to prevent rotation of the cam back to the armed position.

DETAILED DESCRIPTION

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 1:
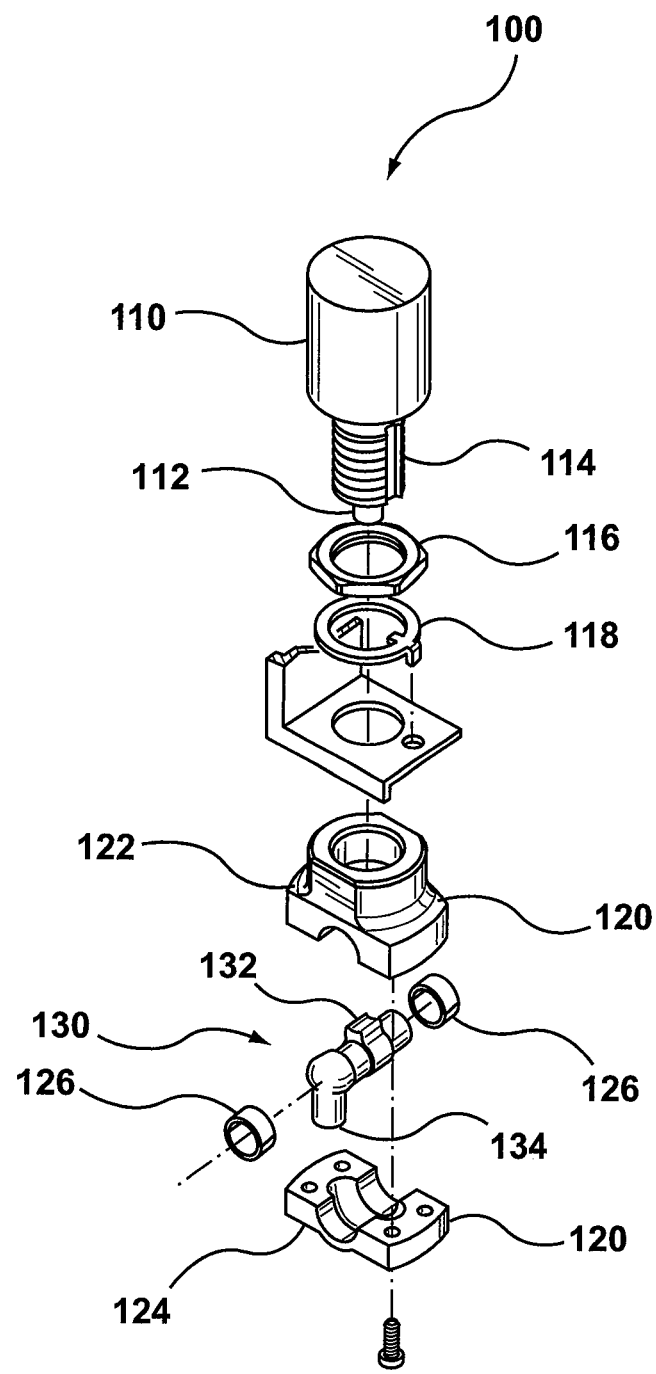
FIG. 1 is an exploded view of an embodiment of a switch assembly.

Referring first to FIG. 1, an exploded view of an embodiment of a switch assembly 100 is shown. Switch assembly 100 comprises a switch 110 having an actuator 112, a housing 120, and a cam 130 that is rotatable within housing 120. Cam 130 has an actuator-engaging portion 132 that engages with actuator 112 of switch 110 and trigger-engaging portion 134 that projects outside housing 120 opposite actuator-engaging portion.

Actuator 112 is biased to extend away or outwards from switch 110. A spring or other resilient mechanism can be used to bias actuator, such as those used in known microswitch designs. For example, switch 110 can be implemented as a microswitch that has a cylindrical plunger that extends outwards from the microswitch. The extended position of actuator 112 represents a first electrical state of switch 110 that can be referred to as disarmed (or latched), and a retracted position of actuator 112 relative to the extended position can represent a second electrical state of switch 110 that can be referred to as armed.

Switch 110 is armed by actuator-engaging portion 132 of cam 130 engaging actuator 112 into the retracted position. This is referred to as the active position of cam 130 where the actuator-engaging portion 132 maintains actuator 112 in the armed position. The bias force from actuator 112 helps retain cam 130 in position to prevent rotation of cam 130. In the active position, an external force that engages with trigger-engaging portion 134 can cause cam 130 to rotate into what is referred to as the triggered position. Actuator engaging portion 132 is shaped so that actuator 112 is in the retracted state when cam 130 is in the active position but rotation of cam 130 to the triggered position allows actuator 112 to move towards the extended position.

In a preferred embodiment, actuator-engaging portion 132 of cam 130 is shaped to prevent rotation of cam 130 back towards the active position from the triggered position. The bias force from actuator 112 against actuator-engaging portion 132 can limit rotation of cam 130 to prevent someone from manually resetting switch 110 into the armed position by applying force to trigger-engaging portion 134. In these embodiments, in order to reset switch 110, actuator 112 should be moved into the retracted position and cam 130 rotated to the active position and then actuator 112 can be released to extend against actuator-engaging portion 132 of cam 130 to maintain the active position of cam 130. In some embodiments this can first require removal of housing 120, or at least lower portion 124, or a special tool to reset switch 110.

Housing 120 can be comprised of an upper portion 122 and a lower portion 124. Upper portion 122 and lower portion 124 can be attached by cap screws or other means. Housing 120 can contain bearings 126 to provide rotation to cam 130. In other embodiments, housing 120 can contain a pin about which cam 130 can rotate. Switch 110 can have a threaded portion 114 for receiving nut 116 and lock washer 118. In other embodiments bearings 126 can be eliminated by making the upper portion 122 and lower portion 124 of housing 120 out of a bearing material to simplifying the assembly.

Figure 2A:
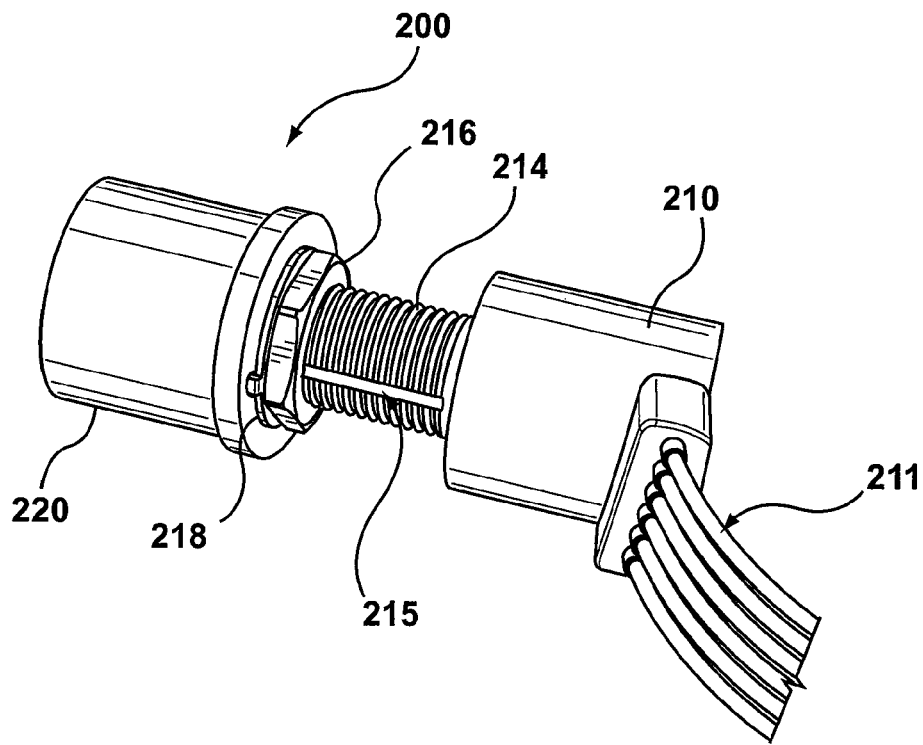
FIG. 2A is a perspective view of an embodiment of a switch assembly.
Figure 2B:
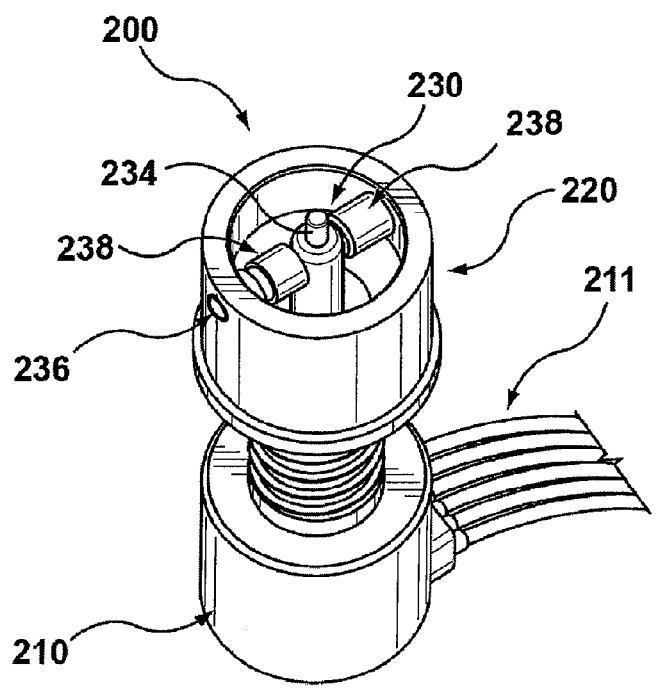
FIG. 2B is a bottom end perspective view of the switch assembly shown in FIG. 2.

Referring now to FIGS. 2A and 2B, a perspective view and a bottom end perspective view, respectively, of an embodiment of a switch assembly 200 is shown. Switch assembly 200 comprises a switch 210, a housing 220, and a cam 230 that is rotatable within housing 220. Housing 220 is threaded onto threaded portion 214 of switch 210. The position along threaded portion 214 is fixed by nut 216 and lock washer 218. Threaded portion 214 includes a keyway 215 that engages with a key on the inner diameter of lock washer 218. The outer diameter of lock washer 218 includes a bent tab that engages with housing 220. Switch 210 includes wiring 211 that is used to couple switch 210 to an indicator to provide a visual indication of the electrical status of switch 210 (e.g. armed or disarmed).

FIG. 2B illustrates trigger-engaging portion 234 of cam 230 in the active position. Cam 230 rotates about axis 236 and includes spacers 238 to position cam 230 in the center of housing 220. Trigger-engaging portion 234 can extend outwardly past the bottom edge of housing 220. In other embodiments, trigger-engaging portion 234 can remain within housing 220 and housing 220 can define a channel on the bottom surface to allow an external trigger to enter within housing 220 to engage with trigger-engaging portion.

Figure 3:
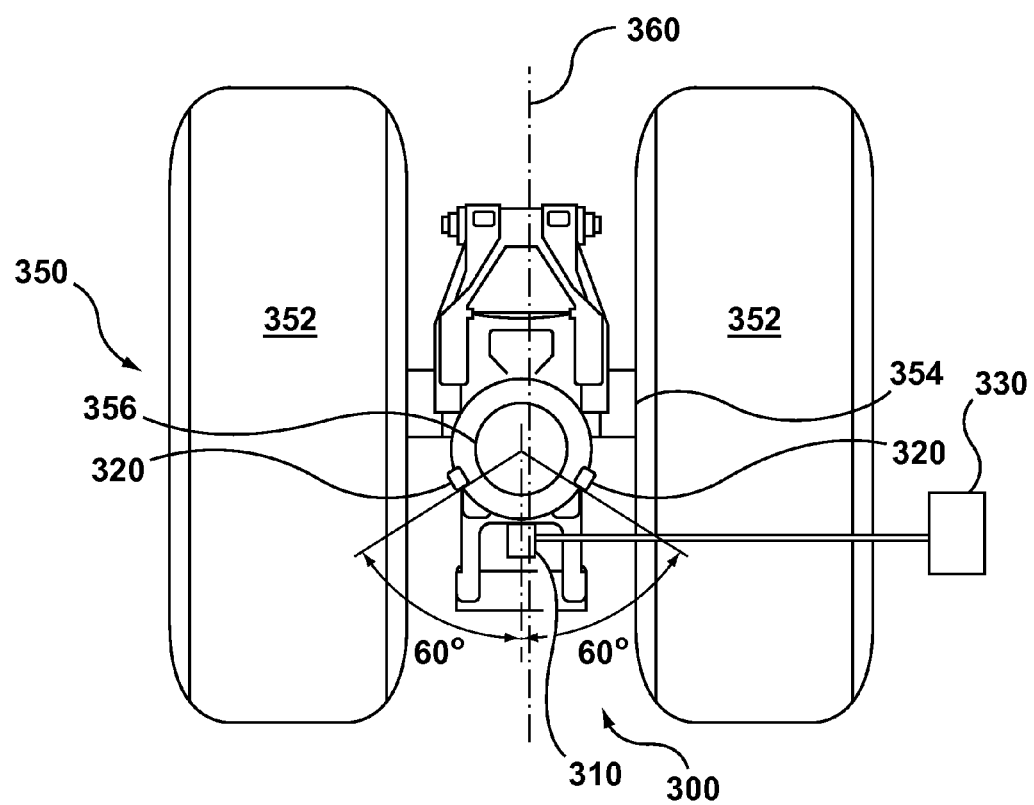
FIG. 3 is a top view of a diagram of an embodiment of an over-steer detection system for detecting an over-steer event of an aircraft landing gear.

Referring now to FIG. 3, a top view of a diagram of an embodiment of an over-steer detection system 300 for detecting an over-steer event of an aircraft landing gear 350 is shown. Aircraft landing gear 350 can be a nose landing gear assembly. Aircraft landing gear 350 can include one or more wheels 352 located on a central axle 354 that is mounted on the end of a landing gear leg 356. Aircraft landing gear 350 is shown with a steering angle of zero degrees in which central axle 354 is perpendicular to longitudinal axis 360 of the aircraft. Aircraft landing gear 350 is illustrated having a maximum allowable steering angle of 60 degrees, beyond which results in an over-steer event that may result in damage to aircraft landing gear 350 or airframe.

A tow vehicle typically attaches to a nose landing gear and the steering and some of hydraulic systems are disengaged to allow the nose landing gear to freely rotate, to some degree, under the influence of the tow vehicle. It is possible with most aircraft landing gears for the tow vehicle to cause aircraft landing gear 350 to turn at an excessive steering angle and past its mechanical limits, thus causing considerable damage to aircraft landing gear 350, and possibly surrounding structural elements of the aircraft.

Over-steer detection system 300 can detect whether an over-steer event has occurred to indicate the possibility that aircraft landing gear 350 may be damaged. Over-steer detection system 300 includes a switch assembly 310, such as those described with respect to FIGS. 1, 2A and 2B, that is mounted in a fixed location on aircraft landing gear 350. Switch assembly 310 is initially in an armed position and is triggered into a disarmed position if one of the triggers 320 mounted to landing gear leg 356 rotates past switch assembly 310 to indicate the occurrence of an over-steer event. FIG. 3 illustrates a single switch assembly 310 mounted in a fixed location on landing gear 350 that is capable of detecting two triggers 320 that indicate clockwise or counter-clockwise over-steer. Other embodiments can use multiple switch assemblies with one or more triggers. In other embodiments, switch assembly 310 can be moveable and triggers 320 can be fixed to aircraft landing gear 350.

Switch assembly 310 includes a cam rotatable within the switch assembly housing that engages with one of triggers 320 in an over-steer event. Triggers 320 can include protrusions on landing gear leg 356 that are located to indicate that the maximum allowable steering angle has been exceeded in an over-steer event. Engaging with one of triggers 320 will cause the cam to move to a triggered position that will cause the switch assembly to change state by movement of a switch actuator. Switch assembly 310 is coupled to an indicator 330 to provide a visual or audible indication of the status of switch assembly 310 to signal if an over-steer event has possibly occurred. Indicator 330 can include a light or alarm in the cockpit of the aircraft, and can also include a light or alarm visible to the on-ground operations personnel. In some embodiments, indicator 330 can further include a processor and memory for interrogating switch assembly 310. Switch assembly 310 can be coupled to indicator 330 through known aircraft data buses. If indicator 330 shows that an over-steer event may have occurred then a landing gear over-steer inspection would be initiated by the appropriate personnel.

The cam of switch assembly 310 is a mechanical switching element that does not require electrical power. If an over-steer event occurs when the aircraft power systems are not in operation, the state of switch assembly 310, and whether an over-steer event has occurred, can be ascertained by indicator 330 once the power systems are brought back online. This provides an advantage over known proximity sensor system that require a battery to maintain over-steer detection when aircraft power systems are not in operation. Preferably, the cam of switch assembly 310 can not be easily manually reset by a tow operator to conceal the occurrence of an over-steer event.

Referring now to FIGS. 4A-D, an embodiment of a switch assembly 400 in use moving from an armed position to a disarmed position is shown. Switch assembly 400 comprises a switch 410 having an actuator 412. Switch 410 is coupled to a housing 420 that contains a cam 430 that is rotatable within housing 420.

Figures 4A, 4B:
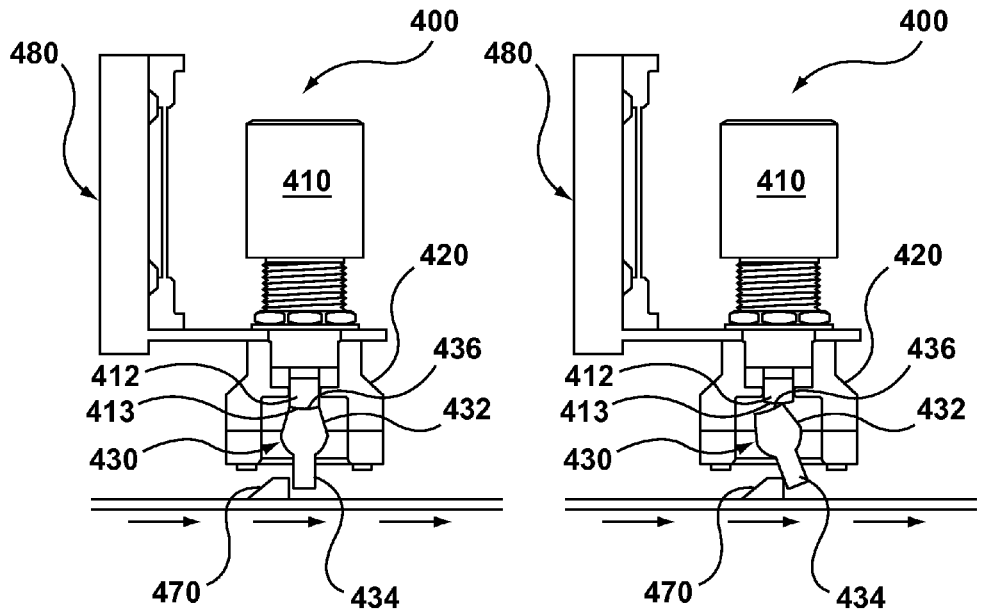
FIGS. 4A-D illustrates an embodiment of a switch assembly, described herein, in use moving between an armed position to a disarmed position.
Figures 4C, 4D:
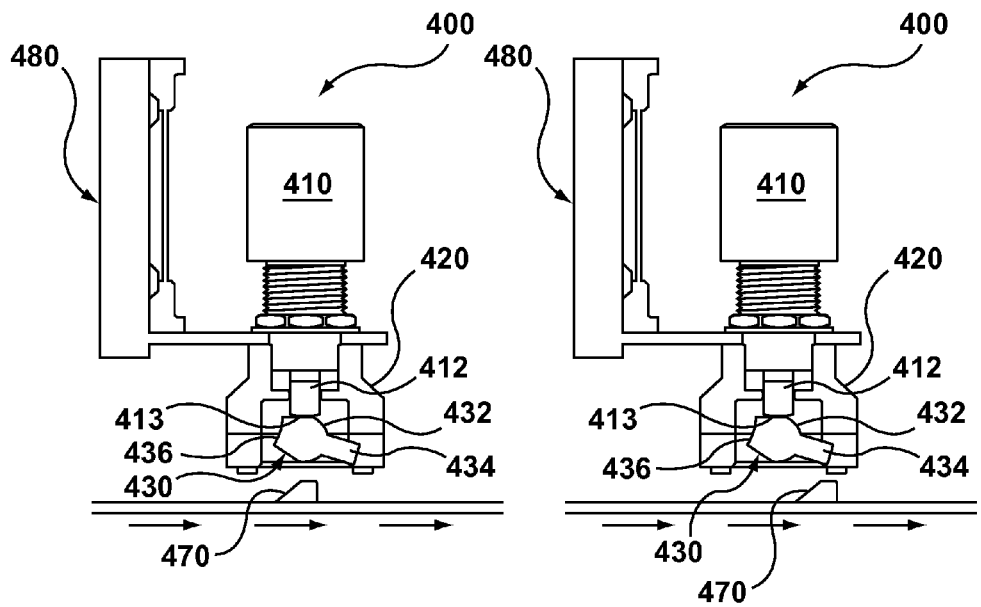

FIG. 4A illustrates switch assembly 400 in an armed position with actuator 412 retracted relative to the disarmed position of actuator 412 shown in FIG. 4D. Cam 430 has an actuator-engaging portion 432 that maintains actuator 412 in the armed position as shown in FIG. 4A. Actuator 412 is biased to apply force to actuator-engaging portion 432 of cam 430 to maintain the position shown in FIG. 4A. In an embodiment using a microswitch with a plunger actuator, the plunger is compressed and spring loaded against the cam.

The top surface of actuator-engaging portion 432 of cam 430 can define a socket 436 that mates with the bottom surface 413 of actuator 412. The mating surfaces can be tailored to provide a desired level of resistance against shock, vibration and unintended activation of switch assembly 400.

In some embodiments, the mating surfaces of actuator 412 and cam 430 can be complementary to prevent accidental or unintended switch actuation. For example, bottom surface 413 of actuator 412 can have a rounded or convex mating surface and socket 436 of actuator-engaging portion 432 can be cupped or concave. Embodiment incorporating a microswitch with a plunger having a rounded surface can mate with a concave cam socket. Other embodiments may employ other surface shapes to assist mating and prevent unintended switch actuation, and can include, without limitation, rollers, levers, and discs.

FIGS. 4A-D illustrate trigger 470 moving towards the right relative to switch assembly 400. In FIG. 4B, trigger 470 has made contact with a trigger-engaging portion 434 of cam 430 and initiated rotation of cam 430. Trigger 470 forces cam 430 to rotate about its axis of rotation in housing 420. The axis of rotation of cam 430 can be positioned to result in a large moment of rotation of actuator-engaging portion 432 from a small moment of trigger-engaging portion 434. Alternatively, the axis of rotation of cam 430 can be positioned to result in a small moment of rotation of actuator-engaging portion 432 from a large moment of trigger-engaging portion 434. As cam 430 begins rotating it can further compress actuator 412 upwards as actuator 412 is unseated from socket 436. Once actuator 412 is unseated from socket 436, bias force from actuator 412 can cause further rotation of cam 430 as actuator 412 engages with the side surfaces of actuator-engaging portion 432 of cam 430. Actuator-engaging portion 432 of cam 430 has a length greater than its width so that as cam 430 rotates further actuator 412 extends into the disarmed position when engaging the shorter width of actuator-engaging portion 432 as illustrated in FIG. 4C. Again, referring to FIG.

4C, switch 410 has actuator 412 in an extended position and is now disarmed/latched providing a different electrical state from that shown in FIG. 4A.

Bias force extending actuator 412 forces trigger-engaging portion 434 of cam 430 upwards. The downward force of actuator 412 maintains cam 430 in a latched position. Side surfaces of actuator-engaging portion 432 can have a latching surface that engages with actuator 412 and prevents rotation of cam 430 back towards the armed position shown in FIG. 4A. The detail of the geometry of latching surface can prevent resetting cam 430 and switch 410 back to the position shown in FIG. 4A by manually applying force to cam 430. Latching surface geometry is described in more detail with respect to FIGS. 5A-C. Cam 430 is latched in position and is not resettable to an armed position unless housing 420 is removed or a special tool is used along with internal access to the housing 420. Other embodiments can design cam geometry to allow an easily resettable mechanism that can be reset by force applied to cam 430.

FIG. 4D illustrates that trigger-engaging portion 434 of cam 430 has moved upwards to allow trigger 470 to clear cam 430. Housing 420 can include a detent for stopping further rotation of cam 430 from that shown in FIG. 4D.

Switch assembly 400 can further include a mounting bracket 480 that can mount switch assembly 400 to an aircraft landing gear. Switch assembly can be mounted on aircraft landing gear such that trigger 470 engages with trigger-engaging portion 434 when over-steer occurs.

Referring now to FIGS. 5A-C, an embodiment of a cam 530 of a switch assembly is shown interacting with the actuator 512 of a switch. Cam 530 and actuator 512 are shown in the armed position in FIG. 5A with cam 530 aligned with the longitudinal axis 501 of actuator 512. Actuator 512 is cylindrical with a round bottom surface 513 that is mated with a socket 536 of actuator-engaging portion 532 of cam 530. A triggering force (illustrated by arrow along axis 502) applied to trigger-engaging portion 534 of cam 530 causes initial rotation of cam 530 about cam axis 531. Cam 530 can be symmetrical and can be triggered in either direction from a triggering force.

FIG. 5B illustrates cam 530 at the tipping point with actuator 512 after the triggering force has caused rotation of cam 530. Bottom surface 513 is unseated from socket 536. Downward force of actuator 512 causes further rotation of cam 530 into the disarmed position shown in FIG. 5C.

FIGS. 5A-C illustrate an embodiment of a geometry of latching surface 533. The side surfaces of actuator engaging portion 532 has a latching surface 533 to engage actuator 512 to prevent reversing rotation to the armed position shown in FIG. 5A. Latching surface 533 can include a depression that engages the bottom surface 513 of actuator 512 to prevent rotation of cam 530. The depression in latching surface 533 can include, for example, a groove or dimple. In some embodiments, latching surface 533 can also include a ridge in the side surfaces of actuator engaging portion 532 as shown in FIGS. 5A-C. Actuator 512 acts as a detent to engage with the latching surface 533 to prevent rotation of cam 530. Referring to FIG. 5C, if cam 530 is forced to rotate clockwise in an attempt to reset switch assembly 500, the edge of latching surface 533 imparts a contact force on actuator 512 that is perpendicular to longitudinal axis 502 of travel of actuator 512. This clockwise force will not drive actuator 512 to compress and change state.

The geometry of latching surface and the actuator can also prevent reversing rotation of the cam to the armed position. FIG. 6 illustrates an embodiment of cam 630 and actuator 612 that may not be effective in latching cam 630 to prevent rotation because of the geometry of cam 630 and actuator 612. Torque applied to cam 630 could allow cam 630 to be moved back into the armed position where bottom surface 613 is seated in socket 636. In contrast, FIG. 7 illustrates a preferable embodiment that prevents cam rotation due to the geometry of cam 730 and actuator 712. If an attempt is made to manually rotate cam 730, then latching surface 733 will engages with edge 715 of actuator 712 between bottom surface 713 and side surface 717 that is parallel with longitudinal axis 701 to prevent cam 730 from rotating back to the armed position. Comparing FIGS. 6 and 7 illustrates that a preferable geometry for latching the cam can include cam 730 extending along longitudinal axis 702 of cam 730 so that it interferes with edge 715 of cam 730. FIG. 7 also illustrates that it can be preferable for the width of actuator 712 perpendicular to longitudinal axis 701 to be sufficiently narrow so that it can engage with latching surface 733.

While this invention has been described with reference to illustrative embodiments and examples, the description is not intended to be construed in a limiting sense. Thus, various modification of the illustrative embodiments, as well as other embodiments of the invention, will be apparent to persons skilled in the art upon reference to this description.

Any publications, patents and patent applications referred to herein are incorporated by reference in their entirety to the same extent as if each individual publication, patent or patent application was specifically and individually indicated to be incorporated by reference in its entirety.

The invention claimed is:

1. An over-steer detection system for detecting an over-steer event of an aircraft landing gear, the system comprising:
   a switch having an actuator movable between an armed and disarmed position, the actuator biased towards the disarmed position;
   a housing coupled to the switch;
   a cam rotatable within the housing, the cam having an actuator-engaging portion and a trigger-engaging portion, the cam having an active position and a triggered position, in the active position the actuator-engaging portion of the cam maintains the actuator in the armed position;
   a trigger that engages the trigger-engaging portion of the cam to move the cam towards the triggered position in the over-steer event, in the triggered position the actuator moves to the disarmed position; and
   an indicator coupled to the switch to signify occurrence of the over-steer event.

2. The over-steer detection system of claim 1, wherein the housing is mounted to the aircraft landing gear and the trigger is a protrusion on the aircraft landing gear that engages the cam during the over-steer event.

3. The over-steer detection system of claim 1, wherein the actuator biased in the disarmed position maintains the cam in the triggered position after an over-steer event.

4. The over-steer detection system of claim 3, wherein the actuator-engaging portion of the cam is shaped to engage the actuator in the triggered position to prevent manual rotation of the cam.

5. The over-steer detection system of claim 4, wherein a side surface of the actuator-engaging portion defines a depression to prevent manual rotation of the cam.

6. The over-steer detection system of claim 1, wherein the actuator is a plunger with a rounded end and the actuator-engaging portion of the cam has a concave end portion to prevent accidental switch actuation.

7. The over-steer detection system of claim 1, wherein the trigger-engaging portion of the cam protrudes from the housing in the active position.

8. The over-steer detection system of claim 7, wherein the trigger-engaging portion of the cam is recessed within the housing in the triggered position.

9. The over-steer detection system of claim 1, wherein an axis of rotation of the cam within the housing is positioned to result in a large movement of the actuator-engaging portion from a small movement of the trigger-engaging portion.

10. A switch device, the device comprising:
   a switch having an actuator moveable between a retracted and extended position, the actuator biased to the extended position;
   a cam housing coupled to the switch; and
   a cam rotatable within the cam housing, the cam engaging the actuator and rotatable from an active position to a latched position, in the active position the cam maintains the actuator in the retracted position.

11. The switch device of claim 10, wherein the cam has an actuator-engaging surface that is shaped to engage the actuator in the active position to prevent unintended switch actuation.

12. The switch device of claim 11, wherein the actuator is a cylindrical plunger with a rounded end and the actuator-engaging surface is concave.

13. The switch device of claim 10, wherein in the latched position the actuator is in the extended position and engages the cam to limit movement of the cam towards the active position.

14. The switch device of claim 13, wherein the cam has a latching surface that is shaped to limit movement of the cam when engaged with the actuator in the latched position.

15. The switch device of claim 14, wherein the latching surface defines a depression to limit movement of the cam when engaged with the actuator in the latched position.

16. The switch device of claim 14, wherein in the latched position the latching surface is angled to prevent movement of the cam when engaged with the actuator.

17. The switch device of claim 10, wherein a portion of the cam projects outside of the housing in the active position.

18. The switch device of claim 17, wherein the portion is recessed inside the housing in the latched position.

19. The switch device of claim 10, wherein the switch is a microswitch.

\* \* \* \* \*